US012560172B2

(12) United States Patent
Pereira Foresti et al.

(10) Patent No.: US 12,560,172 B2
(45) Date of Patent: Feb. 24, 2026

(54) MEASUREMENT NODE, MONITORING NETWORK, MASTER ELECTRONIC BOARD, DIELECTRIC OIL CONTAMINATION DETECTION SENSOR, AND MONITORING SYSTEM OF A SCP

(71) Applicants: PETRÓLEO BRASILEIRO S.A.—PETROBRAS, Rio de Janeiro (BR); UNIVERSIDADE FEDERAL DE MINAS GERAIS, Belo Horizonte (BR)

(72) Inventors: Bernardo Pereira Foresti, Rio de Janeiro (BR); Leonardo Adolpho Rodrigues Da Silva, Belo Horizonte (BR); Edgar Campos Furtado, Belo Horizonte (BR); Tarsis Prado Barbosa, Belo Horizonte (BR); Luis Antônio Aguirre, Belo Horizonte (BR)

(73) Assignees: Petróleo Brasileiro S.A.—Petrobras, Rio de Janeiro (BR); Universidade Federal de Minas Gerais, Belo Horizonte (BR)

( * ) Notice: Subject to any disclaimer, the term of this patent is extended or adjusted under 35 U.S.C. 154(b) by 413 days.

(21) Appl. No.: 18/308,592

(22) Filed: Apr. 27, 2023

(65) Prior Publication Data

US 2024/0084804 A1 Mar. 14, 2024

(30) Foreign Application Priority Data

Sep. 12, 2022 (BR) ...................... 10 2022 018165 9

(51) Int. Cl.
| | |
|---|---|
| *F04D 15/00* | (2006.01) |
| *F04D 13/06* | (2006.01) |
| *G01N 27/22* | (2006.01) |

(52) U.S. Cl.
CPC ..... *F04D 15/0088* (2013.01); *F04D 13/0606* (2013.01); *G01N 27/228* (2013.01)

(58) Field of Classification Search
CPC ........... F04D 15/0088; F04D 13/0606; G01N 27/228
(Continued)

(56) References Cited

U.S. PATENT DOCUMENTS

| | | | |
|---|---|---|---|
| 7,028,543 B2 | 4/2006 | Hardage et al. | |
| 7,740,064 B2 | 6/2010 | McCoy et al. | |

(Continued)

*Primary Examiner* — Nathaniel T Woodward
(74) *Attorney, Agent, or Firm* — Knobbe, Martens, Olson & Bear LLP

(57) ABSTRACT

Systems and methods of the present disclosure relate to the distribution and network connection of instrumentation units, wherein each consists of a firmware based on a microcontroller and temperature and vibration sensors. These units, designated as measurement nodes, are installed at various points along the casing of the pieces of equipment that make up a subsea submersible centrifugal pump (SCP), enabling the characterization of temperature profiles and different modes of vibration throughout the body of the drive In addition to processing vibration components sampled at high frequency, the microcontroller unit will enable the transmission of such signals at low frequency to the platform. There will also be the flexibility to choose the formatting of the vibration data that will be sent, preferably the Autoregressive (AR) model. The invention further proposes the installation of a dielectric oil contamination detection sensor to monitor the dielectric oil contamination of the SCP motor.

6 Claims, 5 Drawing Sheets

(58) Field of Classification Search
USPC ......................................................... 73/168
See application file for complete search history.

(56) References Cited

U.S. PATENT DOCUMENTS

| | | |
|---|---|---|
| 7,979,240 B2 | 7/2011 | Fielder |
| 10,458,224 B2 | 10/2019 | Dickenson et al. |
| 2019/0107463 A1* | 4/2019 | Suga ................... G01M 13/003 |
| 2020/0319011 A1* | 10/2020 | Brewer ................ G01F 23/265 |
| 2021/0133607 A1* | 5/2021 | Stubbs ................... G06N 20/00 |
| 2022/0333608 A1* | 10/2022 | Wrighton ............... F04D 13/10 |

* cited by examiner

100

10

MEASUREMENT NODE, MONITORING NETWORK, MASTER ELECTRONIC BOARD, DIELECTRIC OIL CONTAMINATION DETECTION SENSOR, AND MONITORING SYSTEM OF A SCP

FIELD

The present invention pertains to the field of oil exploration. More specifically, the present invention is related to a sensing and monitoring system for a submersible centrifugal pump (SCP) installed at the bottomhole or nearby.

BACKGROUND

Submersible centrifugal pumps (SCP) are fundamental pieces of equipment in oil and gas exploration, playing a significant role in pumping material from the bottom of an exploration well to the surface. SCP are subject to various loads and wear, both internal and external, due to their application; for example, temperature and pressure of water, temperature, pressure and abrasion of the pumped material, and vibration.

To monitor the performance and status of the SCP, a sensor set, known as a bottom sensor (SDF), is typically installed in the base of the lower motor of the SCP. However, this ordinary configuration of the State of the Art contemplates measurements only in the region close to the coil head located at the base of the lower motor, as well as in the encapsulation of the electronic board of the bottom sensor. Such measurements comprise an approximate range of tens of centimeters in the longitudinal extension of the SCP, while it typically has tens of meters in the same direction. Likewise, the SCP vibration measurement only occurs in the encapsulation of the bottom sensor, which occupies a range of tens of centimeters within a piece of equipment that has a longitudinal extension of tens of meters.

Consequently, the sensor sets currently used only measure localized quantities in a very narrow range of the body of the SCP, which leads to the loss of relevant information about the thermal and vibration behavior in the rest of the SCP. Consequently, the detection of SCP anomalies and failures is impaired, in addition to the detection of the own operating condition of the SCP, resulting in a negative impact on the useful life of this piece of equipment and sub-optimal production.

An indirect consequence of the conventional solution mentioned above is that the sensor set of the State of the Art is not capable of producing a characterization of temperature or vibration profiles along the body of the SCP, which makes it impossible to characterize overheating points in specific regions of the piece of equipment. The lack of knowledge of the temperature profile prevents improvements in the thermal dissipation design, as well as makes it impossible to establish a correlation between production operating points and the respective impact on overheating of SCP regions. This last phenomenon can lead to the permanence of the operation in production points that promote overheating in a specific region of the SCP body, leading, for example, to accelerated aging of the motor insulating varnish (among other factors). As a result of this and other possible early defects, the SCP needs to be changed more frequently. To do so, it is necessary to interrupt the well operation to perform the recovery of the defective SCP and its subsequent replacement, causing losses due to the interruption of the well operation, in addition to the costs associated with the replacement of the defective SCP.

The topology of the current proposed solutions for SCP dedicated instrumentation networks consists of sending data sampled by the sensors directly to a central microcontroller. This topology prevents such data from being processed between sections of the complete instrumentation and transmission system, which extends from the sensor installation point to the platform. The total path taken by the data, from the measurement point to the platform, is extensive. In some sections of this path, the instrumentation network cables travel close to the motor, where there is a pronounced capacitive coupling between the cables and the motor casing. This situation favors the coupling of noise in the cables of the instrumentation network. In addition, in current commercial solutions, the transmission section between the bottom sensor and the platform has a low passband, which prevents the transmission of data from the sensors at a high sampling rate. With the reduced sampling rate, there is a loss of information related to high frequency phenomena, which are indicative of risks to the operational health of the piece of equipment. Therefore, although SCP instrumentation networks already exist, the absence of distributed data processing in current SCP instrumentation networks leads to a reduction in the quantity and quality of produced data.

Some conventional solutions to the problems above involve launching a dedicated communication link between the production well and the platform. This link can be implemented via a wireless network, requiring the installation of transmitters in the production well, whose space is reduced and precious due to the oil flow rate. Other proposals use the launching of cables dedicated to the communication of the central microcontroller with the network sensors, from the well to the platform. This last topology brings inconvenience to subsea applications, due to the launch of new cables. To overcome the observed inconveniences, both in wireless and wired transmissions, manufacturers of commercial bottom sensors use the own power cable of the SCP motor, the cable used in common mode with the data transmitted by such sensors. Due to the voltage supply by Pulse Width Modulation (PWM) imposed by the inverter to the motor, the cable used in common mode by the bottom sensor has its frequency spectrum vastly occupied, which limits the transmission passband of the bottom sensor. Thus, although there is the convenience of using the motor power cable as part of the transmission circuit, there is the inconvenience of still having a reduced passband, limiting the quality and quantity of data that can be sent to the platform team. The reduced passband prevents data sampled at high frequency from being transmitted to the platform teams, which inhibits the transmission of relevant information and that are related to high frequency phenomena such as, for example, spectral components measured by the vibration of the casing of the SCP set, when there is an increase in the gas fraction of the produced fluid.

This problem would also be minimized if the network topology incorporated intermediate data processing points, with the processing based on microcontrollers and distributed between the sensor installation point and the platform. In this proposal, the distributed processing points would serve as data storage locations and also for selecting which data are to be sent to the platform.

Further, the absence of distributed data processing, with microcontrollers installed in the communication link, inhibits the implementation of data encoders. Without data encoders, there is no way to implement compression algorithms, which further contributes to the difficulty in transmitting high frequency spectral components to the surface, due to the reduced passband between the measurement points and the data receiver on the platform.

It is also noteworthy that the technical literature demonstrates the correlation between mechanical problems and spectral components of the vibration signals. Such components have characteristic frequencies and, thus, their sampling demands a higher acquisition rate than the one currently used in the State of the Art. In addition, for such information to be made available to the platform team, there is also a need for a high passband data transmission system between the well and the platform, and this condition is not verified due to the high length of the cables used in the data transmission system. As already explained, the current systems for sensing and processing vibration signals are unable to send the highest frequency spectral components to the platform, thus characterizing a loss of relevant information related to the operational condition of the SCP.

There is also a lack as to how to encapsulate the sensors in a SCP instrumentation network. Commercial solutions for bottom sensors include instrumentation networks in which the electronic elements of the sensors are installed inside the encapsulation of the bottom sensor itself, or in the dielectric oil of the motor. Therefore, in such solutions, there is no demand for specific encapsulations for the sensors; however, there is a low number of sensors present in the pump body. This low number of sensors inhibits the knowledge of the distribution of a physical signal along the body of the drive, which then inhibits the identification of regions along the body of the SCP that are more sensitive to the thermal and vibrational conditions associated with a point of operation chosen by the platform team.

There is also no mention, either in a commercial environment or in filed patents, of the contribution of the encapsulation design to the convenience of installing the network next to the body of the SCP. This installation is critical, as it involves the connection between the electrical and electronic elements of the network, which are small and delicate, with the body of the SCP, which is bulky, has a high mass, and whose transport logistics from the surface to the production well is time consuming and costly. The complexity of this installation favors mechanical collisions that would damage the instrumentation network. To avoid such a problem, the network should be installed next to the body of the SCP moments before it runs into the production well, which requires a design of the sensor encapsulations that allows interconnecting the measurement nodes with electrical cables at the time the SCP runs into the production well. Further, the design of such encapsulations is not limited to the mechanical protection of the sensors, since their body can serve as a path for the circulation of coupled electromagnetic noises from the motor to the network. In addition, there is a need for the encapsulation to serve as a path for conducting heat from the motor body to a temperature sensor to be installed inside the same.

It is also noteworthy that there are, in the State of the Art, few works related to the measurement of contamination of the dielectric oil of the SCP motor. This contamination occurs when the well fluid mixes with the dielectric oil of the SCP set at the interface point of these fluids, located in the sealing/protective element. Due to the presence of such contamination, the concentration of water in the dielectric element increases, which accelerates the aging of the insulating varnish that covers the copper coils of the motor. When this aging becomes pronounced, the copper coil, which is electrically energized, loses its electrical insulation, causing a short circuit between turns of the same coil, between turns of different coils, or between a turn and the stator casing of the SCP. Consequently, there is a decrease in the useful life of the SCP, since there is an increase in the electric currents of the motor. In addition, an electrical imbalance of the motor circuit occurs, which generates a negative-sequence rotating magnetic sequence field, which can inhibit motor starting after a well production interruption. These problems could be minimized with design changes to the seals/protectors, or even by changing the SCP operating points. However, in any of the cases mentioned, it is necessary to know the contamination profile of the dielectric oil as a function of operating time, as well as the rate of variation of such contamination over time, according to specific operating points determined by the production team. Therefore, there would be a notable gain associated with measuring the dielectric oil contamination.

Therefore, the State of the Art lacks an improved SCP monitoring system capable of detecting variations in temperature, vibration and pressure throughout the entire length of the SCP for rapid identification of anomalies, in order to enable immediate corrective action to preserve the service life of the piece of equipment.

The State of the Art lacks a design for encapsulating temperature and vibration sensors suitable for the working conditions of a bottomhole and providing noise protection.

The State of the Art also lacks an improved SSP monitoring system, capable of transmitting signals to the surface in such a way that there is no significant loss of data.

The State of the Art still lacks a system for monitoring the dielectric oil contamination of the SCP motor.

STATE OF THE ART

The document of the state of the art U.S. Pat. No. 10,458,224 B2 discloses a monitoring of one or more items of equipment associated with a well or other conduit. A sensor system includes a vibration sensor for detecting vibrations at one or more sensor locations associated with one or more items of equipment and/or well or other conduit. A processing system processes the sensor information to determine a characteristic of the operation of one or more items of equipment and/or the well or other conduit. This prior art suggests the use of more than one sensor set in paragraphs 9 and 97, but nothing is mentioned about the protection encapsulation of such sensors, which is a critical item both due to the severe conditions of the production well and the effect of such encapsulation on the thermal and electromagnetic performance of the instrumentation network, and does not specify a data transmission system capable of sending high frequency signals. Nor does it describe or suggest a dielectric oil contamination monitoring system of the SCP motor.

The document of the state of the art U.S. Pat. No. 7,979,240 B2 discloses a system and method for real-time monitoring and failure prediction of electric submersible pumps. The design includes generating a failure prediction value with a management system, calculating a percentage change of the respective first measurement values and the stable operating values provided by the corresponding users, the failure prediction value representing the electric submersible pump failure probability. This prior art also suggests the use of more than one sensor set in its column 4, lines 23 to 48, but without specifying sensors specially adapted for a SCP and does not specify a data transmission system capable of sending signals at high frequency. Nor does it describe or suggest a dielectric oil contamination monitoring system of the SCP motor.

The document of the state of the art U.S. Pat. No. 7,740,064 B2 discloses a bottomhole submersible pump system, method and apparatus using fiber optic sensors and temperature sensors distributed below the submersible pump to monitor the pump discharge pressure and temperature, inlet pressure and temperature, and motor temperature. In addition, distributed temperature sensors are used below the pump to monitor drillings within the wellbore. This prior art also suggests the use of more than one sensor set in its column 4, lines 37 to 51, but without specifying sensors specially adapted for a SCP and without specifying a data transmission system capable of sending signals at high frequency. Nor does it describe or suggest a dielectric oil contamination monitoring system of the SCP motor.

The document of the state of the art U.S. Pat. No. 7,028,543 B2 discloses a method and system for monitoring the operation of bottomhole pieces of equipment, such as electric submersible pumps. The method and system rely on the use of coiled fiber optic sensors such as hydrophones, accelerometers, and/or flowmeters. These sensors are coupled or placed close to the piece of equipment being monitored. As the sensor is disturbed by acoustic pressure disturbances emitted by the piece of equipment, the length of the sensing coil changes, allowing the creation of a pressure versus time signal. This signal is converted into a frequency spectrum indicative of the acoustic emissions of the piece of equipment, which can be manually or automatically monitored to verify whether the piece of equipment is functioning normally or abnormally, allowing the operator to take the necessary corrective actions. This prior art also suggests the use of more than one sensor set in column 5, lines 21 to 24, and FIG. 4; however, without specifying sensors specially adapted for a SCP and without specifying a data transmission system capable of sending signals at high frequency. Nor does it describe or suggest a dielectric oil contamination monitoring system of the SCP motor.

SUMMARY OF THE INVENTION

The present invention contemplates the distribution and connection in a network of a multiplicity of measurement nodes, each one of them consisting of firmware based on the microcontroller, vibration sensor and temperature sensor. The measurement nodes are installed at various points along the casing of the pieces of equipment that make up the SCP. In an exemplary embodiment, one measurement node is installed at each of 128 points along the casing of the pieces of equipment that make up the SCP. Considering a typical total length of 41 meters for this piece of equipment, temperature and vibration samples can be obtained, on average, every 32 centimeters in its longitudinal extension. This distance between the measurement nodes makes it possible to characterize temperature profiles and different vibration modes along the entire body of the piece of equipment, making it possible to correlate the operating condition of the SCP with the measured data. This innovation enables predictive actions that promote an increase in the useful life of the pieces of equipment, preserving time and resources. It is also noteworthy that the microcontroller unit of each measurement node is further configured to allow the flexibility of choosing the formatting of the vibration data that will be sent by software. In an exemplary embodiment, there can be sent the parameters of parametric models of vibration signals, as well as the amplitude and frequency of their spectral components in an Autoregressive (AR) model.

An additional aspect of the present invention contemplates the shipment of a microcontroller unit for processing the signals of the sensor sets in the same encapsulation of the bottom sensor (SDF) of the SCP. The microcontroller unit is configured to process the vibration signals sampled at high frequency. In addition to processing vibration components sampled at high frequency, the microcontroller unit is additionally configured to transmit such signals at low frequency to the surface, in consonance with the low passband limitation of the existing transmission channel between the production well and the platform.

The present invention further contemplates the installation of the measurement nodes and their respective encapsulations in the space between the SCP casing and the oil well piping. As this space is restricted, and the production fluid passes therethrough, in a preferred embodiment, the chosen sensors are of the MEMS (Micro Electromechanical Sensors) type, without being limited to the same, configured to be able to perform network communication incorporated into their respective hardware.

To avoid breaking the cables of the sensor network during the transport of the SCP, the present invention also proposes the method of installing the network, which includes the fixation of the measurement nodes on the pump preparation bench and the interconnection thereof, by electric cable, already on the rig (or on land, when feasible), when the SCP is being hoisted to the production post.

BRIEF DESCRIPTION OF THE DRAWINGS

The present invention will be described below with reference to typical embodiments thereof and also with reference to the attached drawings, in which.

DETAILED DESCRIPTION OF THE INVENTION

Specific embodiments of the present disclosure are described below. In an effort to provide a concise description of these embodiments, all features of an actual implementation may not be described in the specification.

The present invention incorporates several functional improvements of high relevance to the SCP instrumentation networks. Such improvements, when implemented, will lead to an increase in the quality and quantity of data made available to the operation team, allowing the identification of the operation points that lead to failures in the SCP. With this data in hand, the operating team can make adjustments, such as changing the operating point to a more favorable one, contributing to an increase in the useful life of the piece of equipment. In addition, the present invention facilitates refinements in the design of the SCP by allowing the sampling of data at various points along the body of the piece of equipment, allowing to identify specific points in the body of the drive where overheating or excessive vibration has occurred.

Figure 1:
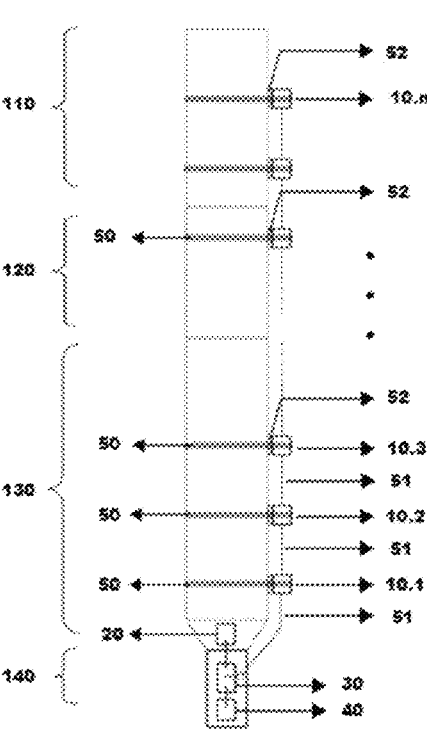
FIG. 1 is a representation of the distribution of the measurement nodes in the body of the SCP set, according to the present invention, where there are indicated: SCP (100), pump (110), seal/protector (120), motor (130), bottom sensor (SDF) (140), tape for fixing the node (50), electrical cable or fiber optic of the main network (51), thermally conductive and electrically insulating resin (52), dielectric oil contamination sensor (20), master board (30), pressure sensor (40), measurement nodes (10.1 . . . 10.n)

Referring to FIG. 1, a first aspect of the invention is related to the network of sensor sets and their installation in the body of the piece of equipment that makes up the SCP.

The SCP is generally indicated by the numeral 100 with the understanding that it consists of various pieces of equipment as known in the State of the Art. By way of example only, the SCP 100 is shown here having a pump 110, a seal/protector 120, a motor 130, and a housing 140 containing the bottom sensor (SDF).

Also shown in FIG. 1 are the dielectric oil contamination detection sensor 20 on the motor base 130, and the master electronic board 30 and the pressure sensor 40 on the housing of the SDF 140. These components will be referenced later.

It will be appreciated that this configuration of the SCP 100 is not limiting, the invention being applicable to any type of SCP. It should also be noted that many components may have been omitted to simplify the description. It will also be appreciated that none of the components exemplified herein will be depicted in detail because they are common knowledge and to simplify the description.

Along the body of the pieces of equipment 110-140 that make up the SCP 100, multiple measurement nodes are installed, generally referred to here as 10, which contain the sensor sets. In the example of FIG. 1, the first measurement node 10.1 is installed on the motor 130 proximal to the housing of the SDF 140, fixed to the casing of the piece of equipment by a suitable means of fixation 50; for example, a tape that simultaneously links the measurement node 10 and the casing of the piece of equipment of the SCP, suitable to withstand the same temperatures, abrasions and vibrations to which the SCP will be subjected. Evidently, this means of fixation can be any other considered suitable for specific applications, such as screws or adhesive resins, for example. A thermal and electrical insulator 52, such as a resin with high thermal conductivity and high electrical insulation interconnects, by means of gluing, the measurement node 10.1 and the casing of the motor 130, completing the installation.

The procedure is repeated for the other sensors 10.2, 10.3 to 10.$n$, completing the installation of the measurement nodes. It will be readily understood that the quantity and positioning of the measurement nodes 10 exemplified in FIG. 1 is just a simple example to facilitate the understanding of the invention. The present invention is not limited to the quantity nor to the distribution of measurement nodes 10 seen in FIG. 1. The present invention contemplates any quantity of measurement nodes in any distribution that are understood as suitable for specific applications.

The 10 nodes form a main network, being conveniently interconnected. In FIG. 1, the interconnection is represented by the cable 51, which can be a cable carrying electrical signals or a fiber optic cable. Such a cable must be specified to withstand the pressures, temperatures and vibrations inherent in subsea and bottomhole operations. It is also possible that the interconnection between nodes 10 is done wirelessly, without departing from the scope of the invention. For simplicity, the description that follows will assume a physical cable and the drawings will omit wireless transmitters and receivers for simplicity; however, this should not be understood as limiting.

Figure 2:
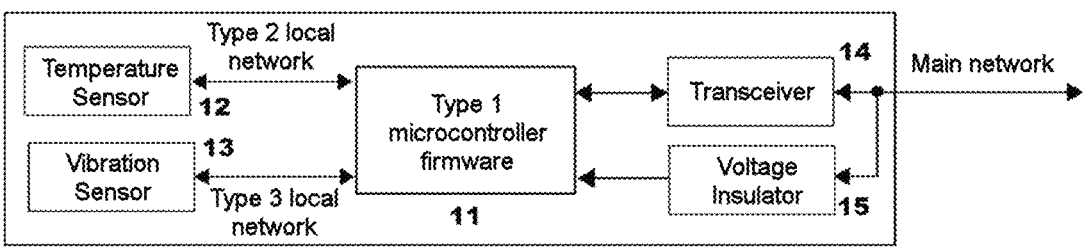
FIG. 2 is a representation of the topology of each measurement node, according to the present invention, where the measurement node (10) is represented.

Referring now to FIG. 2, the components of the measurement node 10 will be exemplified. Each measurement node comprises a microcontroller firmware 11, for example, a type 1 microcontroller firmware that connects to at least one temperature sensor 12, to at least one vibration sensor 13, to at least one transceiver 14, and to at least one voltage insulator 15. As these components are widely known in the State of the Art, they will not be described in greater detail, for simplicity. The connection between the firmware 11 and the temperature sensor 12 is preferably done through the type 2 local network, while the connection between the firmware 11 and the vibration sensor 13 is preferably done through the type 3 local network. The transceiver 14 connects node 10 to the main network.

Type 2 and type 3 local area networks can operate in any protocol with wired, wireless or fiber optic transmission. The connection of the transceiver 14 with the main network can also be done through physical means, or wirelessly, as previously explained. Finally, the voltage insulator 15 interconnects the supply system of the main network to the microcontroller firmware 11. Advantageously, the voltage insulator 15 provides electrical insulation in order to provide immunity to electrical noise to the measurement node 10.

The microcontroller firmware 11 processes the signals from the sensors 12 and 13 of the respective node 10 and sends them to the transceiver 14 which, in turn, transmits them to the main network. In an embodiment where the interconnection between the nodes and the main network is physical, the transceiver 14 is connected via electrical conductor or fiber optic to a bus common to all nodes 10.1 . . . 10.$n$, effectively making the main network bus an electrical point common to all nodes 10.1 . . . 10.$n$.

Advantageously, the individual microcontroller firmware 11 for each sensor set form a distributed monitoring network, being additionally configured to compress the sampled data already at the point of installation of the sensors. To enable the increase in the amount of data available at the output of the instrumentation network, data encoding is performed in order to compress the transmission packet. Such processing is preferably implemented by an Autoregressive (AR) model, in which the compression is done by running an algorithm in each microcontroller firmware 11, producing the parameters of the AR model, which are then transmitted. When the final surface receiver receives these parameters, the measurement point data can be reconstructed. In this approach, it is possible to transmit data with compressions greater than 90%; that is, the model parameters are stored in a data vector with a size smaller than 10% of the size of the data vector sampled by the sensors at the measurement point.

Figure 3:
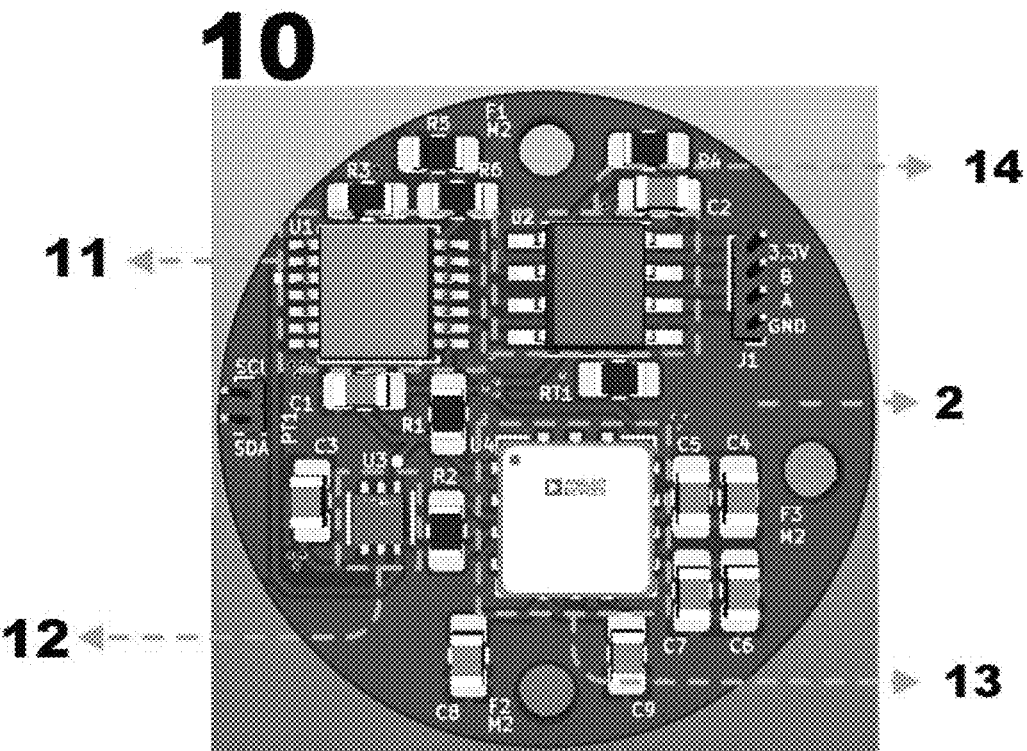
FIG. 3 is an exemplary representation of the electronic components of a measurement node on a circuit board, according to the present invention, where there are represented: measurement node (10), type 1 microcontroller firmware (11), temperature sensor (12), vibration sensor (13), transceiver (14)

In FIG. 3, an exemplary preferred configuration of the components of the measurement node 10 on a printed circuit board 2 is illustrated, with all components protected by a silicone film. Obviously, this configuration is just an example and should not be understood as limiting the present invention. However, the advantages of this preferred configuration will become clear below.

Figure 4:
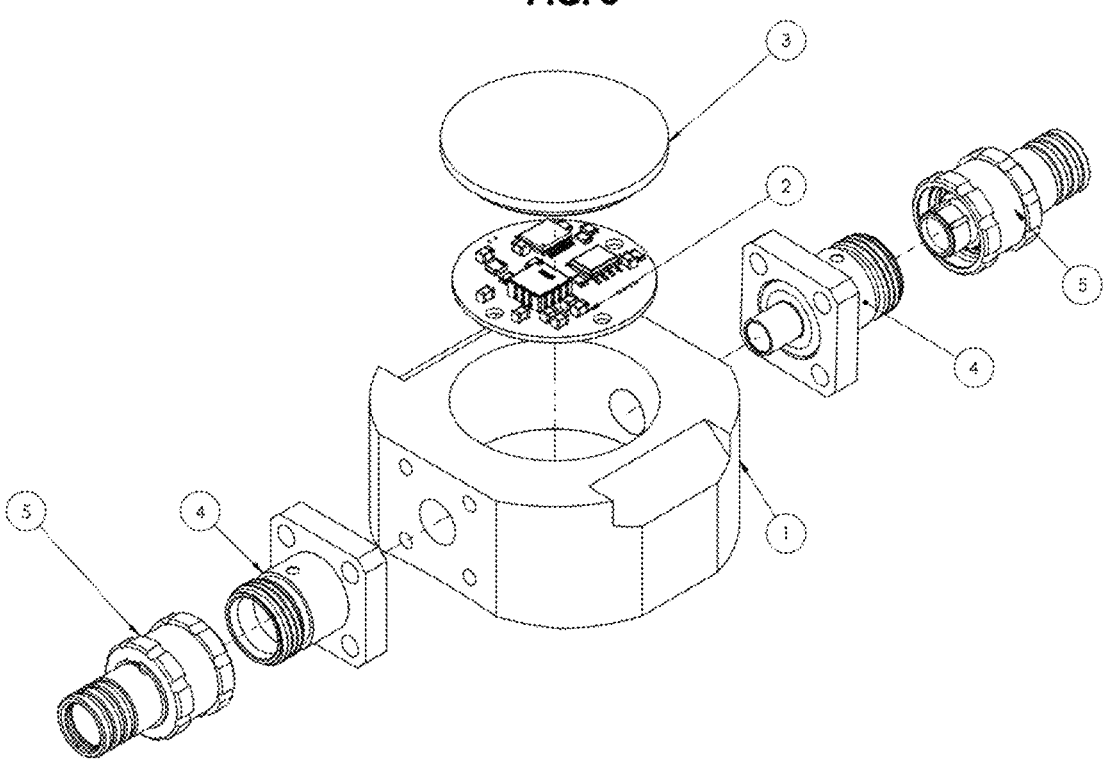
FIG. 4 is a representation of the encapsulation of each measurement node, according to the present invention, where there are represented: encapsulation (1), electronic board (2), lid (3), female cable connector (4), male cable connector (5)

The printed circuit board 2 is housed inside the mechanical encapsulation 1 of the measurement node 10 as shown in FIG. 4. The encapsulation 1 is interconnected to a lid 3. Preferably, the lower face of the lid 3, which is inside of encapsulation 1, is covered with a two-component epoxy resin (cold solder) to ensure tightness between the lid 3 and the inner wall of encapsulation 1. More preferably, the entire space between the lid 3 and the silicone film that surrounds the upper part of electronic board 2 is filled by cold solder. Externally, the lid 3 is closed by a coating that ensures sealing, preventing the passage of fluid into the interior of the encapsulation 1. Such a coating can be any coating suitable for this purpose known in the state of the art.

The encapsulation 1 is also interconnected to two female type connectors 4, which are mounted facing the two planes of the outer wall of the encapsulation 1. Female type connectors 4 have a sealing ring (O-ring) to ensure operation in pressures of up to 68.94 MPa in the marine environment. The sealing ring is preferably made of Fluorocarbon (Viton) or Tetrafluoroethylene/Propylene (AFLAS) and withstands temperatures up to 230° C. The female type connectors 4 are each connected to a respective male type connector 5. The male type connectors 5 are interconnected by a plug integrated with the cable or fiber optic used for signal transmission and for powering the sensors 12 and 13 of the measurement node 10. Each male type connector 5 has an internal sealing ring to ensure tightness between the male type connectors 5 and the female type connectors 4. The electrical signal or fiber optic cable promotes the interconnection of the male type connector 5 of an encapsulation 1 to the male type connector 5 of the next encapsulation 1; for example, the male type connector 5 of encapsulation 1 of measurement node 10.1 to the male type connector 5 of encapsulation 1 of measurement node 10.2. As shown in FIG. 1, the encapsulation 1 of the measurement nodes 10 are preferably interconnected to the body of the SCP by a tape 50 that simultaneously links the measurement node 10 and the body of the SCP 100. It is also shown in FIG. 1 that a resin 52 with high thermal conductivity and high electrical insulation interconnects encapsulation 1 of measurement nodes 10 to the body of SCP 100 by means of gluing.

The encapsulation described above has functions of mechanical protection, thermal conductivity, rejection of electromagnetic noises, and that enable the installation of the network next to the body of the SCP moments before the SCP runs into the production well. It is noteworthy that, without an encapsulation that incorporates the mentioned functions, the desired technical effects of distributed processing and data encoding become more difficult to achieve.

Figure 5:
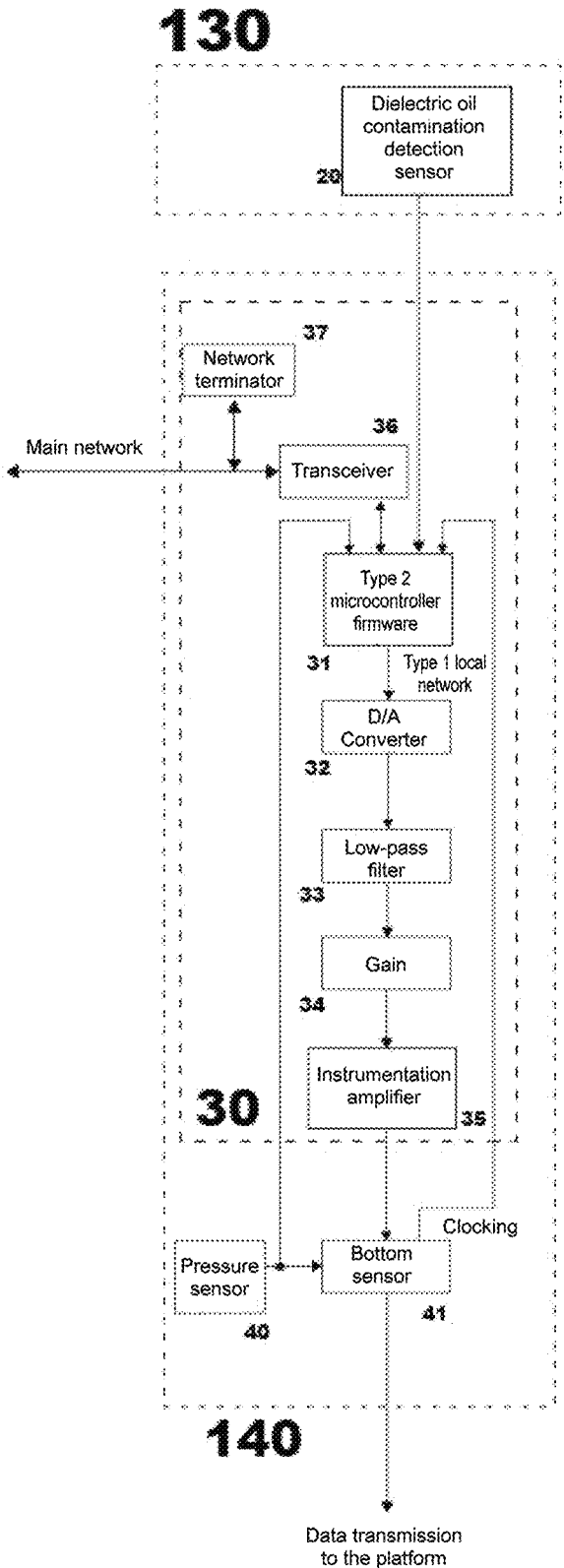
FIG. 5 is a representation of the topology of the master electronic board, dielectric oil contamination detection sensor, pressure sensor, and bottom sensor, according to the present invention, where there are: master board (30), motor (130), bottom sensor (SDF) (140)

Referring now to FIG. 5, an exemplary block diagram of a preferred topology between the master electronic board 30, the housing of the SDF 140 and the dielectric oil contamination sensor dielectric 20 will be described.

The master electronic board 30, according to the present invention, is installed in the housing of the SDF 140 and comprises a microcontroller firmware 31, for example, type 2 microcontroller firmware. The microcontroller firmware 31 has a series connection with a digital-to-analog converter 32, a low-pass filter 33, a gain 34, and an instrumentation amplifier 35, the latter being finally connected to the bottom sensor 41 itself.

Advantageously, the microcontroller firmware 31 is also configured to compress the sampled data already at the point of installation of the sensors, such as the microcontroller firmware 11 of the measurement nodes 10. That is, the microcontroller firmware 31 is also additionally configured for the implement data compression preferably according to an Autoregressive (AR) model, obtaining the same results achieved by the compression of microcontroller firmware 11.

The housing of the SDF 140 still carries the pressure sensor 40. Note that with the exception of the master electronic board 30, its components and the connection to the main network, all devices seen in FIG. 5 are inherent in an enclosure of conventional SDF. According to the present invention, the master electronic board 30 and the connection to the main network are installed in a state-of-the-art SDF enclosure, just as the measurement nodes 10 are installed in a conventional SCP. Advantageously, this allows the implementation of the invention described here in any SCP.

The microcontroller firmware 31 also connects to a transceiver 36 that, in turn, connects to a network terminator 37 and the main network bus previously described in FIG. 1 and FIG. 2. The network terminator 37 fulfills the function of matching the network impedance in order to prevent distortions in the signal. The network terminator 37 can be, for example, an impedance designed to match the impedance of the master electronic board 30. In particular applications, the network terminator 37 can be a capacitive or an inductive load.

In this way, the master electronic board 30 is connected to the same common point of all measurement nodes 10, being able to receive the signals sent by the measurement nodes 10 in its microcontroller firmware 31.

The microcontroller firmware 31 also receives the output signals from the dielectric oil contamination detection sensor 20 present in the air gap of the motor 130 of the SCP. The microcontroller firmware 31 is configured to promote hardware and software processing of both the signals received from the measurement nodes 10 and the signals received from the dielectric oil contamination detection sensor 20. At the end of this processing, the output signals are digitally encoded for transmission to the surface production platform; however, they still need to be converted to analog signals with voltage levels compatible with the conventional bottom sensor 41.

For this, the output data of the microcontroller firmware 31 are sent to the digital-analog converter 32, through an interconnection preferably implemented by type 1 local network, which can operate under any communication protocol. The digital-to-analog converter 32 is configured to convert the data to analog format and to transmit it to the analog low-pass filter 33. The interconnection between the digital-to-analog converter 32 and the low-pass filter 33 is made by the tracks of the master electronic board 30 The aforementioned analog low-pass filter 33 is then interconnected to a gain module 34, configured to adjust the voltage levels of the analog signal of the network implemented in the invention to the voltage levels compatible with the conventional bottom sensor 41. The gain module 34 is interconnected to the instrumentation amplifier 35, which is configured to promote a change in the reference electrical potential level of the signal coming from the gain module 34, causing it to be referenced to the electrical potential of the ground terminal (not shown) of the electronics of the bottom sensor 41. The instrumentation amplifier 35 is in turn interconnected to the bottom sensor 41. The signals from the network proposed in this invention will then be multiplexed in time by the conventional bottom sensor 41, as is typically done with other signals sent to the platform by the bottom sensor 41, without changing the electronic structure of the bottom sensor 41, or the structure of the data transmission system from the well to the platform.

Still referring to FIG. 5, the present invention also contemplates a connection between the microcontroller firmware 31, according to the present invention, and a dielectric oil contamination detection sensor 20. This connection can be made by the same cables electric conventionally launched between the housing of the SDF 140 and the lower base of the motor 130 of the SCP 100 through a mechanical penetrator already existing in the conventional SCP 100. Said mechanical penetrator is typically used for launching the cables of the conventional temperature sensor, which is also located at the base of the lower motor of an SCP of the State of the Art. That is, again, the present invention can be incorporated into an SCP of the State of the Art, without the need for a significant adaptation of the structure of the piece of equipment.

Figure 6:
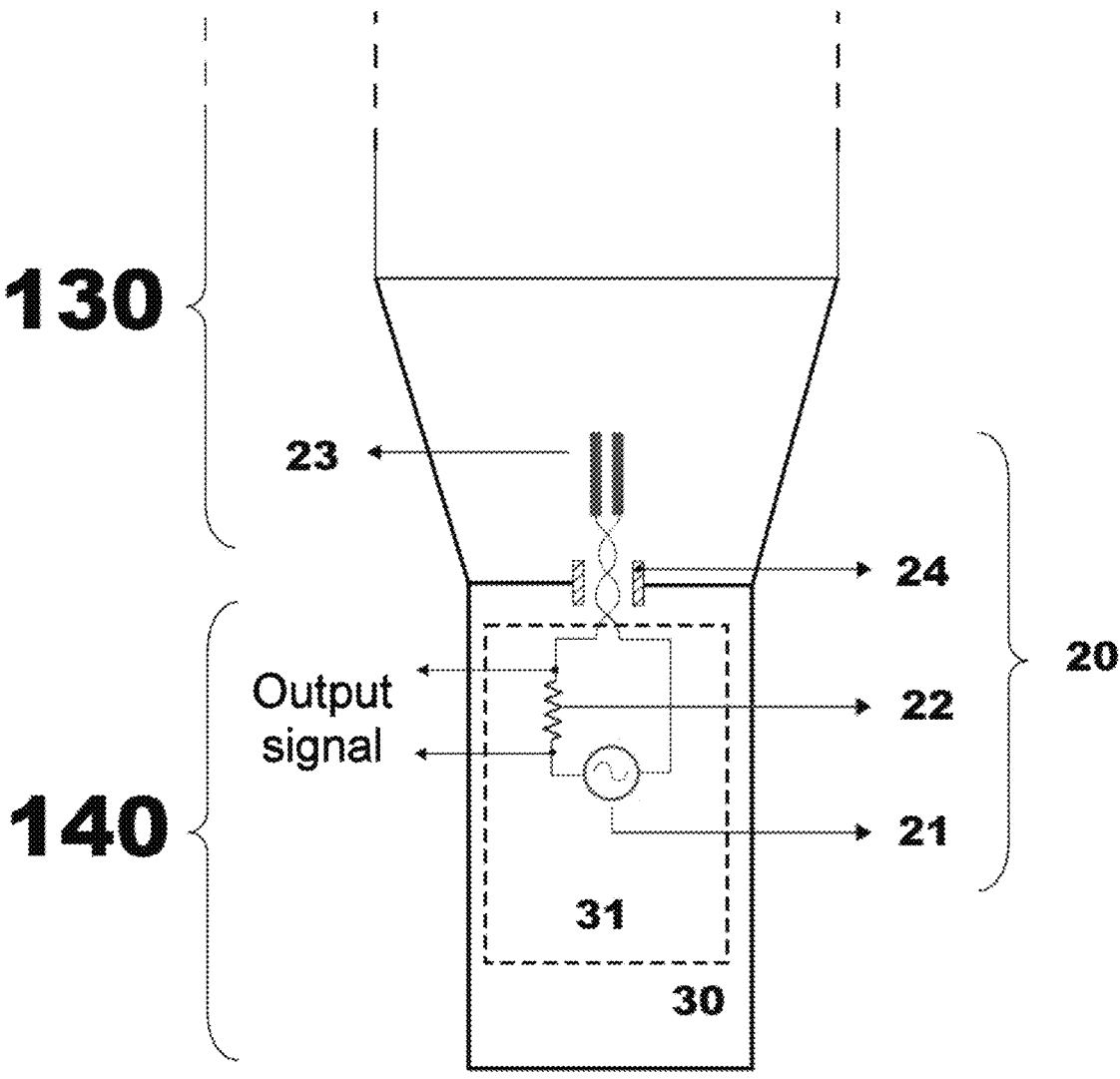
FIG. 6 is a representation of the electrical circuit of the dielectric oil contamination detection sensor, according to the present invention, where there are represented: dielectric oil contamination sensor (20), sinusoidal voltage source (21), resistor (22), capacitor dipped in the dielectric oil (23), penetrator (24), master board (30), type 2 controller firmware (31), lower motor of the SCP (130), bottom sensor (SDF) (140)

With reference to FIG. 6, the dielectric oil contamination detection sensor 20, according to the present invention, will be described in detail. The dielectric oil contamination detection sensor 20 comprises a circuit consisting of a series association between a sinusoidal voltage source 21, a resistor 22, and a capacitor 23. The source 21 and the resistor 22 are installed on the master electronic board 30 described previously, while the capacitor 23 is immersed in the dielectric oil present in the air gap of the lower motor 130 of the SCP 100. Preferably, the capacitor 23 is connected to the rest of the circuit by cables of the twisted-pair type, which are launched through a penetrator 24 conventionally included between the housing of the SDF 140 and the lower base of the motor 130 of the SCP 100. The output of this circuit is characterized by the voltage signal captured at the terminals of the resistor 22 and made available to an analog input of the microcontroller firmware 31. The microcontroller firmware 31 is additionally configured to receive this voltage signal and send it to the bottom sensor 41, in the same way previously described with reference to FIG. 5, for the signals coming from the main network sent by the measurement nodes 10.

Advantageously, a contamination monitoring of the contamination level of the dielectric oil of the motor 130 is obtained. As mentioned earlier, this monitoring allows obtaining a profile of the contamination of the dielectric oil as a function of the operating time, as well as the rate of variation of such a contamination with time, according to specific operating points determined by the production team, which is unprecedented in the State of the Art. Advantageously, obtaining this information will allow studies of changes in the design of sealants, or an alteration of the SCP operating points, which is not possible with the knowledge currently available in the state of the art.

Figure 7:
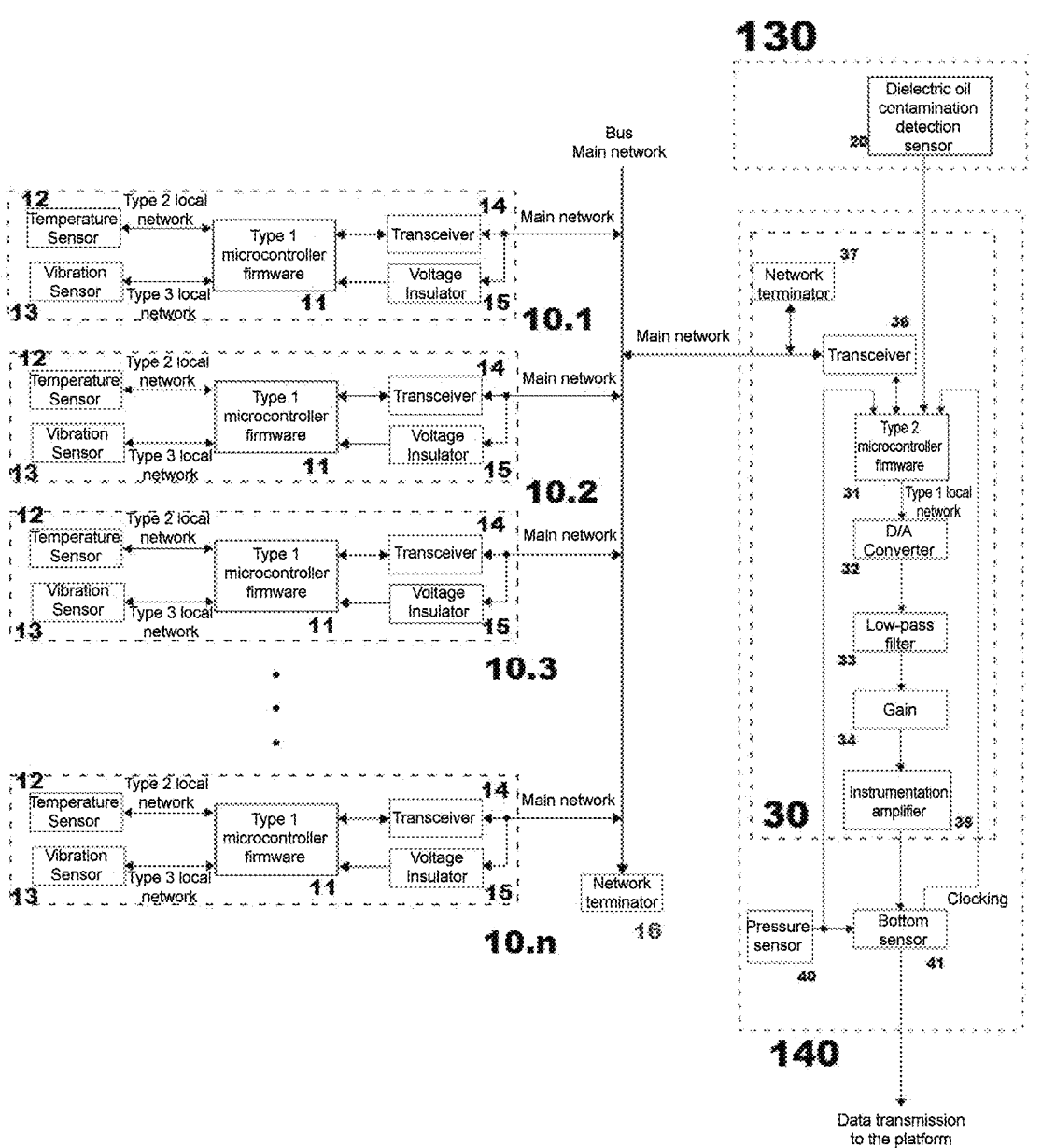
FIG. 7 is a representation of the topology of the complete monitoring system, according to the present invention, where there are represented: measurement nodes (10.1 . . . 10.$n$), master board (30), lower motor of the SCP (130), bottom sensor (SDF) (140).

Referring now to FIG. 7, a simplified macro view of the topology of a complete system will be provided incorporating all the innovations described above, namely the measurement nodes 10, the master electronic board 30, and the dielectric oil contamination detection sensor 20. The implementation of all the innovations described here can be easily done to any state-of-the-art SCP. It is also possible to implement only a subset of the inventive aspects described herein. For example, it is possible to implement only the measurement nodes 10 to the casing of the SCP 100 and the master electronic board 30 to the housing of the SDF 140, excluding the dielectric oil contamination detection sensor 20.

In this Figure, the connection between each of the measurement nodes 10 and between the network of measurement nodes formed by them and the master electronic board 30 is clear. This connection, as mentioned earlier, takes place through a bus of the main network that works as an electrical point common to the measurement nodes and the master electronic board 30. The main network bus has a network terminator 16 that fulfills the equivalent function of the network terminator 37 of the master electronic board 30.

The transmission of data on the main network bus can be done using any communication protocol considered suitable, including, but not limited to, IPv4, IPv6, IPsec, and ICMP.

All technical effects achieved by the present invention—increase in the data sampling rate of the sensors, increase in the amount of data available in a time window, increase in the signal/noise ratio of the data, encapsulation of the sensors with housings that have adequate performance in the thermal, electromagnetic, mechanical, and operational spheres together promote an enormous functional improvement to the SCP instrumentation solution, contributing to the increase of its useful life. It is also noteworthy that the technical effects of each of the innovations described here contribute to improving the technical effect of the other innovations. In other words, the joint implementation of all the innovations described here provides a technical effect and advantages greater than a mere linear sum of each one of them. Namely, the present invention has the following advantages over the state of the art:

Economical/Productivity: Increased SCP lifespan. The innovations described here allow the identification of excessive vibration and temperature at specific points of the drive, making it possible to identify problematic operating points and subsequently change them before a failure of the piece of equipment occurs. In this way, there is a decrease in losses caused by loss of profit for the installation of a new SCP due to premature failure of the piece of equipment.

Health/Safety: With the possibility of increasing the useful life of the SCP, the number of times that such a piece of equipment needs to be installed and removed from the production wells will be reduced, therefore reducing the exposure of platform employees to activities with the body of the SCP hoisted and the resulting risks of its falling in regions through which the teams transit.

Reliability: The measurement of temperature and pressure signals, both distributed in the body of the SCP, will provide data on the state of health of the piece of equipment, enabling the composition of a database that guides the way of operating the SCP, so that this one does not have its accelerated wear. This functionality connotes an increase in the reliability of the piece of equipment, since the predictability of its useful life will be increased. Such predictability allows the use of reliability engineering techniques, with emphasis on the optimization of financial management related to the entire useful life of the SCP, since it will be possible to choose the ideal moments for changing the piece of equipment, as well as the level and cost of intervention in every moment of maintenance.

Environmental: The proposed invention makes it possible to increase the reliability of the SCP and the consequent reduction in its number of replacements in a given time interval. This reduction in replacements also reduces the demand for production, conditioning and transport of the dielectric oil used in the motor sealant and air gap. As this oil can leak into the soil, the reduction in the demand for its handling connotes an environmental advantage.

Other Advantages: The scientific advantages of the proposed invention are also highlighted, since there are no, in the world scientific literature, measurements of temperature, vibration, pressure and contamination level of the dielectric oil, in real time, with a wide distribution of sensors in the body of SCP, in offshore operation conditions, with sampling capacity in wide passband; distributed filtering on the communication link; data encoding capability for compressing the transmitted signal; and design of a protection system for sensors with mechanical, thermal and electromagnetic properties.

The invention described here is applicable to the measurement of temperature, vibration and pressure signals from SCP sets that have a bottom sensor already installed therein, so that the signals generated by the devices and systems described herein are multiplexed with those of the bottom sensor. For cases where the SCP lacks a bottom sensor, or where the bottom sensor has no connection point available, the invention can still be implemented in the SCP provided that a current source type transmitter is installed (not shown) between the instrumentation network of the invention and a receiver on the platform.

The invention can also be applied to pipes installed in refineries, as well as production lines (subsea or surface, rigid or flexible), where there is a wish to characterize the vibration, pressure and temperature signals along the body of the pipes. Also noteworthy is the possibility of using the solution described here in rotating pieces of equipment, such as (but not exclusively) diesel-generator sets or turbogenerators. For this, there is a need to change the routing of the data network cables for the communication of the measurement nodes; however, it is possible to maintain the topology of the network.

Although aspects of the present disclosure may be susceptible to various modifications and alternative forms, specific embodiments have been shown by way of example in the drawings and have been described in detail in this document. But it should be understood that the invention is not intended to be limited to the particular forms disclosed. Rather, it shall cover all modifications, equivalents and alternatives that fall within its scope as defined by the following appended claims.

The invention claimed is:

1. A measurement node comprising:
   a microcontroller firmware;
   a temperature sensor;
   a vibration sensor;
   a transceiver; and
   a voltage insulator;
   wherein the microcontroller firmware is configured to compress data obtained by the temperature sensor and vibration sensor according to an Autoregressive (AR) model,
   and wherein the measurement node is located in an enclosure which provides mechanical protection, thermal conductivity, and electromagnetic noise rejection.

2. The measurement node of claim 1, wherein the measurement node communicates with a bottom sensor of a subsea submersible centrifugal pump.

3. The measurement node of claim 1, wherein the measurement node is a part of a monitoring network.

4. A master electronic board comprising:
   a microcontroller firmware;
   a digital-to-analog converter;
   a low pass filter;
   a gain module;
   an instrumentation amplifier; and
   a transceiver,
   wherein the microcontroller firmware is configured to compress data obtained by a temperature sensor and a vibration sensor according to an Autoregressive (AR) model, and wherein the microcontroller firmware communicates with a bottom sensor of a subsea submersible centrifugal pump.

5. The master electronic board of claim 4, further comprising a dielectric oil contamination detection sensor comprising:
   a circuit comprising a sinusoidal voltage source in series with a resistor and a capacitor, the capacitor being connected to the circuit via a twisted-pair cable,
   wherein the capacitor is immersed in the dielectric oil of a motor of a subsea submersible centrifugal pump, and
   wherein the sinusoidal voltage source and the resistor are located on the master electronic board.

6. A monitoring system for a subsea submersible centrifugal pump comprising:
   at least one measurement node located in an enclosure which provides electromagnetic noise rejection;
   a master electronic board; and
   a dielectric oil contamination detection sensor.

* * * * *